US012544885B2

(12) United States Patent
Schneider et al.

(10) Patent No.: US 12,544,885 B2
(45) **Date of Patent: *Feb. 10, 2026**

(54) IMPACT TOOL

(71) Applicant: MILWAUKEE ELECTRIC TOOL CORPORATION, Brookfield, WI (US)

(72) Inventors: Jacob P. Schneider, Cedarburg, WI (US); Gerald A. Zucca, Akron, OH (US); FengKun Lu, Dongguan (CN); Guang Hu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,268

(22) Filed: Oct. 9, 2023

(65) Prior Publication Data

US 2024/0033883 A1 Feb. 1, 2024

Related U.S. Application Data

(63) Continuation of application No. 16/793,901, filed on Feb. 18, 2020, now Pat. No. 11,780,061.
(Continued)

(51) Int. Cl.
*B25B 21/02* (2006.01)
*B25B 23/18* (2006.01)

(52) U.S. Cl.
CPC ............ *B25B 21/026* (2013.01); *B25B 23/18* (2013.01)

(58) Field of Classification Search
CPC ....... B25B 21/026; B25B 23/18; B25B 21/02; B25B 21/023
See application file for complete search history.

(56) References Cited

U.S. PATENT DOCUMENTS 3,369,615 A 2/1968 Maffey, Jr. et al.
3,768,577 A 10/1973 Leoni
(Continued)

FOREIGN PATENT DOCUMENTS

CN 2715414 Y 8/2005
CN 1949628 A 4/2007
(Continued)

OTHER PUBLICATIONS

Ingersoll Rand, "2850MAX Series Air Impactools ™—Exploded View", Edition 3, Feb. 2018, 2 pages.
(Continued)

*Primary Examiner* — Veronica Martin
(74) *Attorney, Agent, or Firm* — Michael Best & Friedrich LLP

(57) ABSTRACT

An impact tool includes a housing, a motor supported within the housing and having a motor shaft, a drive assembly configured to convert a continuous rotational input from the motor shaft to consecutive rotational impacts upon a workpiece, the drive assembly including a camshaft having a front portion and a rear portion defining a carrier, the rear portion being closer to the motor than the front portion, a thrust bearing engageable with the rear portion of the camshaft, and a gear assembly coupled between the motor shaft and the drive assembly. The gear assembly includes a ring gear and a plurality of planet gears meshed with the ring gear. Each of the plurality of planet gears is coupled to the carrier of the camshaft, and the ring gear rotationally and radially supports the rear portion of the camshaft via the plurality of planet gears.

19 Claims, 9 Drawing Sheets

Related U.S. Application Data

(60) Provisional application No. 62/807,125, filed on Feb. 18, 2019.

(56) References Cited

U.S. PATENT DOCUMENTS

| | | | |
|---|---|---|---|
| 4,327,302 | A | 4/1982 | Hershberger |
| 4,434,546 | A | 3/1984 | Hershberger |
| 4,437,325 | A | 3/1984 | Hershberger |
| 4,476,736 | A | 10/1984 | Hershberger |
| 4,689,973 | A | 9/1987 | Hershberger |
| 4,806,717 | A | 2/1989 | Hershberger |
| 4,905,423 | A | 3/1990 | van Laere |
| RE33,655 | E | 8/1991 | Hershberger |
| 5,269,733 | A | 12/1993 | Anthony, III |
| 5,361,853 | A | 11/1994 | Takamura et al. |
| 5,672,926 | A | 9/1997 | Brandes et al. |
| 5,945,760 | A | 8/1999 | Honda et al. |
| 5,962,944 | A | 10/1999 | Narita et al. |
| 6,008,559 | A | 12/1999 | Asano et al. |
| 6,025,667 | A | 2/2000 | Narita et al. |
| 6,031,311 | A | 2/2000 | Lee |
| 6,049,153 | A | 4/2000 | Nishiyama et al. |
| 6,087,751 | A | 7/2000 | Sakai |
| 6,147,428 | A | 11/2000 | Takazawa et al. |
| 6,177,745 | B1 | 1/2001 | Narita et al. |
| 6,274,960 | B1 | 8/2001 | Sakai et al. |
| 6,300,700 | B1 | 10/2001 | Nishiyama et al. |
| 6,329,734 | B1 | 12/2001 | Takahashi et al. |
| 6,340,857 | B2 | 1/2002 | Nishiyama et al. |
| 6,342,745 | B1 | 1/2002 | Sakai et al. |
| 6,356,001 | B1 | 3/2002 | Nishiyama et al. |
| 6,369,480 | B1 | 4/2002 | Nishiyama et al. |
| 6,437,473 | B1 | 8/2002 | Möbius et al. |
| 6,441,524 | B2 | 8/2002 | Kaneko et al. |
| 6,457,535 | B1 | 10/2002 | Tanaka |
| 6,525,442 | B2 | 2/2003 | Koharagi et al. |
| 6,552,462 | B2 | 4/2003 | Sakai et al. |
| 6,555,940 | B2 | 4/2003 | Naito et al. |
| 6,630,762 | B2 | 10/2003 | Naito et al. |
| 6,664,688 | B2 | 12/2003 | Naito et al. |
| 6,717,315 | B1 | 4/2004 | Tajima et al. |
| 6,741,002 | B2 | 5/2004 | Nishiyama et al. |
| 6,741,003 | B2 | 5/2004 | Naito et al. |
| 6,759,778 | B2 | 7/2004 | Nishiyama et al. |
| 6,774,523 | B2 | 8/2004 | Ahn et al. |
| 6,826,824 | B2 | 12/2004 | Hiroyuki et al. |
| 6,851,343 | B2 | 2/2005 | Sasaki |
| 6,867,526 | B2 | 3/2005 | Mori et al. |
| 6,885,125 | B2 | 4/2005 | Inayama et al. |
| 6,906,444 | B2 | 6/2005 | Hattori et al. |
| 6,917,133 | B2 | 7/2005 | Koharagi et al. |
| 6,927,519 | B2 | 8/2005 | Popov |
| 6,943,474 | B2 | 9/2005 | Inayama et al. |
| 6,956,312 | B2 | 10/2005 | Inayama et al. |
| 6,967,424 | B2 | 11/2005 | Popov |
| 6,979,924 | B2 | 12/2005 | Nishiyama et al. |
| 6,987,342 | B2 | 1/2006 | Hans |
| 7,019,426 | B2 | 3/2006 | Mori et al. |
| 7,057,322 | B2 | 6/2006 | Araki et al. |
| 7,151,335 | B2 | 12/2006 | Tajima et al. |
| 7,170,209 | B2 | 1/2007 | Araki et al. |
| 7,176,598 | B2 | 2/2007 | Mori et al. |
| 7,196,446 | B2 | 3/2007 | Hans |
| 7,204,012 | B2 | 4/2007 | Kloepzig et al. |
| 7,207,393 | B2 | 4/2007 | Clark, Jr. et al. |
| 7,321,177 | B2 | 1/2008 | Uchida et al. |
| 7,330,006 | B2 | 2/2008 | Iwata et al. |
| 7,385,328 | B2 | 6/2008 | Melfi |
| 7,432,624 | B2 | 10/2008 | Kolehmainen et al. |
| 7,436,095 | B2 | 10/2008 | Aydin et al. |
| 7,474,029 | B2 | 1/2009 | Rahman et al. |
| 7,479,723 | B2 | 1/2009 | Dawsey et al. |
| 7,504,754 | B2 | 3/2009 | Jahns et al. |
| 7,521,832 | B2 | 4/2009 | Tajima et al. |
| 7,550,889 | B2 | 6/2009 | Horst et al. |
| 7,560,842 | B2 | 7/2009 | Hattori |
| 7,598,645 | B2 | 10/2009 | Ley et al. |
| 7,605,510 | B2 | 10/2009 | Okuma et al. |
| 7,612,480 | B2 | 11/2009 | Fujii et al. |
| 7,705,503 | B2 | 4/2010 | Takahashi et al. |
| 7,705,504 | B2 | 4/2010 | Nakayama et al. |
| 7,732,965 | B2 | 6/2010 | Nakayama et al. |
| 7,750,523 | B2 | 7/2010 | Nakayama et al. |
| 7,791,236 | B2 | 9/2010 | Liang et al. |
| 7,800,272 | B2 | 9/2010 | Nakayama et al. |
| 7,804,216 | B2 | 9/2010 | Takahashi et al. |
| 7,808,143 | B2 | 10/2010 | Lee et al. |
| 7,843,101 | B2 | 11/2010 | Ito et al. |
| 7,851,958 | B2 | 12/2010 | Cai et al. |
| 7,868,503 | B1 | 1/2011 | Nakayama et al. |
| 7,902,710 | B2 | 3/2011 | Han et al. |
| 7,906,882 | B2 | 3/2011 | Okuma et al. |
| 7,932,658 | B2 | 4/2011 | Ionel |
| 7,952,249 | B2 | 5/2011 | Kori et al. |
| 8,008,825 | B2 | 8/2011 | Suzuki et al. |
| 8,018,109 | B2 | 9/2011 | Leonardi et al. |
| 8,044,546 | B2 | 10/2011 | Liang et al. |
| 8,058,767 | B2 | 11/2011 | Haruno et al. |
| 8,067,871 | B2 | 11/2011 | Tajima et al. |
| 8,080,915 | B2 | 12/2011 | Nakayama et al. |
| 8,120,223 | B2 | 2/2012 | Leonardi et al. |
| 8,138,651 | B2 | 3/2012 | Rahman et al. |
| 8,174,158 | B2 | 5/2012 | Rahman et al. |
| 8,179,011 | B2 | 5/2012 | Takemoto et al. |
| 8,217,547 | B2 | 7/2012 | Kamiya et al. |
| 8,227,953 | B2 | 7/2012 | Suzuki et al. |
| 8,232,703 | B2 | 7/2012 | Nakayama et al. |
| 8,235,137 | B2 | 8/2012 | Walker et al. |
| 8,251,158 | B2 | 8/2012 | Tomayko et al. |
| 8,264,113 | B2 | 9/2012 | Takemoto et al. |
| 8,317,350 | B2 | 11/2012 | Friedman et al. |
| 8,319,387 | B2 | 11/2012 | Maemura et al. |
| 8,328,381 | B2 | 12/2012 | Dixon et al. |
| 8,350,431 | B2 | 1/2013 | Liang et al. |
| 8,381,831 | B2 * | 2/2013 | Sekino .................... B25F 5/001 173/48 |
| RE44,037 | E | 3/2013 | Tajima et al. |
| 8,427,023 | B2 | 4/2013 | Maemura et al. |
| 8,434,564 | B2 | 5/2013 | Tomayko et al. |
| 8,460,153 | B2 | 6/2013 | Rudolph et al. |
| 8,461,737 | B2 | 6/2013 | Feng et al. |
| 8,506,108 | B2 | 8/2013 | Friedman et al. |
| 8,536,748 | B2 | 9/2013 | Liang et al. |
| 8,546,990 | B2 | 10/2013 | Suzuki et al. |
| 8,564,168 | B2 | 10/2013 | Chamberlin et al. |
| 8,598,763 | B2 | 12/2013 | Aota et al. |
| 8,729,763 | B2 | 5/2014 | Kogure et al. |
| 8,820,430 | B2 | 9/2014 | Walker et al. |
| 8,820,955 | B2 | 9/2014 | Dixon et al. |
| 8,827,483 | B2 | 9/2014 | Dixon et al. |
| 8,866,359 | B2 | 10/2014 | Li et al. |
| 8,884,485 | B2 | 11/2014 | Jurkovic et al. |
| 8,928,197 | B2 | 1/2015 | Jurkovic et al. |
| 8,928,198 | B2 | 1/2015 | Lutz et al. |
| 8,957,560 | B2 | 2/2015 | Uchiyama et al. |
| 9,024,499 | B2 | 5/2015 | Nakada |
| 9,028,088 | B2 | 5/2015 | Vanko et al. |
| 9,035,522 | B2 | 5/2015 | Liang et al. |
| 9,130,422 | B2 | 9/2015 | Rahman et al. |
| 9,130,424 | B2 | 9/2015 | Moon et al. |
| 9,266,226 | B2 | 2/2016 | Timmons |
| 9,289,886 | B2 | 3/2016 | Limberg et al. |
| 9,300,175 | B2 | 3/2016 | Shibata |
| 9,328,915 | B2 | 5/2016 | Vanko et al. |
| 9,352,458 | B2 | 5/2016 | Friedman et al. |
| 9,369,012 | B2 | 6/2016 | Hattori et al. |
| 9,415,448 | B2 | 8/2016 | Schenk et al. |
| 9,419,481 | B2 | 8/2016 | Yamaguchi et al. |
| 9,496,758 | B2 | 11/2016 | Kawanami |
| 9,502,930 | B2 | 11/2016 | Huang et al. |
| 9,502,934 | B2 | 11/2016 | Huang et al. |
| 9,515,526 | B2 | 12/2016 | Huang et al. |
| 9,644,837 | B2 | 5/2017 | Vanko et al. |
| 9,647,501 | B2 | 5/2017 | Nigo et al. |

(56) References Cited

U.S. PATENT DOCUMENTS

| | | | |
|---|---|---|---|
| 9,680,341 | B2 | 6/2017 | Takeda et al. |
| 9,705,388 | B2 | 7/2017 | Melfi et al. |
| 9,748,806 | B2 | 8/2017 | Koka et al. |
| 9,755,489 | B2 | 9/2017 | Takemoto et al. |
| 9,755,490 | B2 | 9/2017 | Inuzuka |
| 9,831,729 | B2 | 11/2017 | Kim et al. |
| 9,908,229 | B2 | 3/2018 | Wang |
| 9,908,232 | B2 | 3/2018 | Chen |
| RE46,827 | E | 5/2018 | Rudolph et al. |
| 9,975,224 | B2 | 5/2018 | Tanaka et al. |
| 10,099,351 | B2 | 10/2018 | McGougan |
| 10,668,614 | B2 | 6/2020 | Bartoszek et al. |
| 2002/0094907 | A1 | 7/2002 | Elger |
| 2002/0117923 | A1 | 8/2002 | Takei |
| 2002/0175583 | A1 | 11/2002 | Kikuchi et al. |
| 2005/0099155 | A1 | 5/2005 | Okuda et al. |
| 2005/0225192 | A1 | 10/2005 | Kloepzig et al. |
| 2005/0248320 | A1 | 11/2005 | Denning |
| 2006/0103335 | A1 | 5/2006 | Kolehmainen et al. |
| 2006/0237205 | A1 | 10/2006 | Sia et al. |
| 2006/0279162 | A1 | 12/2006 | Achor et al. |
| 2007/0057589 | A1 | 3/2007 | Tatematsu et al. |
| 2007/0159021 | A1 | 7/2007 | Horst |
| 2007/0193761 | A1 | 8/2007 | Brotto |
| 2008/0196912 | A1 | 8/2008 | Gass et al. |
| 2008/0258573 | A1 | 10/2008 | Kamiya |
| 2009/0140593 | A1 | 6/2009 | Kaiser et al. |
| 2010/0117475 | A1 | 5/2010 | Leonardi et al. |
| 2010/0218386 | A1 | 9/2010 | Kamp et al. |
| 2010/0218966 | A1 | 9/2010 | Liebhard et al. |
| 2011/0156521 | A1 | 6/2011 | Nagashima et al. |
| 2011/0163701 | A1 | 7/2011 | Carrier et al. |
| 2011/0188232 | A1* | 8/2011 | Friedman ................. F21S 9/04 362/119 |
| 2012/0038236 | A1 | 2/2012 | Tajima et al. |
| 2012/0200186 | A1 | 8/2012 | Sano et al. |
| 2013/0033217 | A1 | 2/2013 | Hirabayashi |
| 2013/0043757 | A1 | 2/2013 | Kagami et al. |
| 2013/0057294 | A1 | 3/2013 | Mizoguchi et al. |
| 2013/0075121 | A1 | 3/2013 | Nakamura et al. |
| 2013/0106227 | A1 | 5/2013 | Aoyama |
| 2013/0119810 | A1 | 5/2013 | Aoyama |
| 2013/0187504 | A1 | 7/2013 | Tanaka |
| 2014/0062244 | A1 | 3/2014 | Sano et al. |
| 2014/0091664 | A1 | 4/2014 | Aoyama |
| 2014/0111050 | A1 | 4/2014 | Chamberlin et al. |
| 2014/0147718 | A1 | 5/2014 | Furui et al. |
| 2014/0152139 | A1 | 6/2014 | Huang et al. |
| 2014/0262394 | A1 | 9/2014 | Scott et al. |
| 2014/0262396 | A1 | 9/2014 | McClung |
| 2014/0283373 | A1 | 9/2014 | Melfi et al. |
| 2014/0285050 | A1 | 9/2014 | Melfi et al. |
| 2014/0292132 | A1 | 10/2014 | Kazmin et al. |
| 2015/0034350 | A1* | 2/2015 | Yun ........................ B25B 21/00 173/178 |
| 2015/0091406 | A1 | 4/2015 | Tajima et al. |
| 2015/0130317 | A1 | 5/2015 | Hung et al. |
| 2015/0171684 | A1 | 6/2015 | McClelland et al. |
| 2015/0229172 | A1 | 8/2015 | Kashihara et al. |
| 2016/0056672 | A1 | 2/2016 | Yuan et al. |
| 2016/0111984 | A1 | 4/2016 | Koizumi et al. |
| 2016/0149463 | A1 | 5/2016 | Smith et al. |
| 2016/0149467 | A1 | 5/2016 | Smith et al. |
| 2016/0172912 | A1 | 6/2016 | Nigo et al. |
| 2016/0276886 | A1 | 9/2016 | Baba et al. |
| 2016/0285330 | A1 | 9/2016 | Mukai et al. |
| 2016/0344274 | A1 | 11/2016 | Jurkovic et al. |
| 2016/0354914 | A1 | 12/2016 | Bartoszek et al. |
| 2017/0040854 | A1 | 2/2017 | Saint-Michel |
| 2017/0063211 | A1 | 3/2017 | Mochida et al. |
| 2017/0070111 | A1 | 3/2017 | Kanda et al. |
| 2017/0104375 | A1 | 4/2017 | Kim et al. |
| 2017/0104376 | A1 | 4/2017 | Nakagawa et al. |
| 2017/0106521 | A1 | 4/2017 | Kelleher et al. |
| 2017/0144693 | A1 | 5/2017 | Okubo |
| 2017/0170696 | A1 | 6/2017 | Ogawa et al. |
| 2017/0259411 | A1* | 9/2017 | Ishibashi ................. B25B 21/02 |
| 2017/0302117 | A1 | 10/2017 | Fukumoto et al. |
| 2017/0310194 | A1 | 10/2017 | Beyerl |
| 2017/0326712 | A1 | 11/2017 | Li et al. |
| 2017/0366053 | A1 | 12/2017 | Ash |
| 2018/0076676 | A1 | 3/2018 | Chen et al. |
| 2019/0047125 | A1 | 2/2019 | Junkers et al. |
| 2020/0023503 | A1 | 1/2020 | Malak et al. |
| 2020/0198100 | A1 | 6/2020 | Schneider et al. |
| 2020/0215678 | A1 | 7/2020 | Nakashima |
| 2020/0262037 | A1 | 8/2020 | Schneider et al. |
| 2020/0282540 | A1 | 9/2020 | Bartoszek et al. |
| 2021/0053201 | A1 | 2/2021 | Mandal et al. |

FOREIGN PATENT DOCUMENTS

| | | | |
|---|---|---|---|
| CN | 200983519 | Y | 11/2007 |
| CN | 100392946 | C | 6/2008 |
| CN | 201130876 | Y | 10/2008 |
| CN | 100481678 | C | 4/2009 |
| CN | 101436793 | A | 5/2009 |
| CN | 101917076 | A | 12/2010 |
| CN | 101295891 | B | 2/2012 |
| CN | 202142925 | U | 2/2012 |
| CN | 202142926 | U | 2/2012 |
| CN | 202145610 | U | 2/2012 |
| CN | 102420475 | A | 4/2012 |
| CN | 202260714 | U | 5/2012 |
| CN | 101447705 | B | 11/2012 |
| CN | 103078465 | A | 5/2013 |
| CN | 202918085 | U | 5/2013 |
| CN | 101741199 | B | 6/2013 |
| CN | 203301332 | U | 11/2013 |
| CN | 203312944 | U | 11/2013 |
| CN | 103580327 | A | 2/2014 |
| CN | 102916512 | B | 11/2014 |
| CN | 104638864 | A | 5/2015 |
| CN | 104658748 | A | 5/2015 |
| CN | 104882978 | A | 9/2015 |
| CN | 105048671 | A | 11/2015 |
| CN | 103715799 | B | 3/2016 |
| CN | 103715800 | B | 3/2016 |
| CN | 103715797 | B | 4/2016 |
| CN | 103715798 | B | 4/2016 |
| CN | 103715852 | B | 4/2016 |
| CN | 103715851 | B | 5/2016 |
| CN | 103780038 | B | 5/2016 |
| CN | 105811604 | A | 7/2016 |
| CN | 104104168 | B | 8/2016 |
| CN | 105846627 | A | 8/2016 |
| CN | 106026599 | A | 10/2016 |
| CN | 106451988 | A | 2/2017 |
| CN | 104175160 | B | 4/2017 |
| CN | 105215915 | B | 4/2017 |
| CN | 105437129 | B | 4/2017 |
| CN | 104767338 | B | 6/2017 |
| CN | 206542315 | U | 10/2017 |
| CN | 206759279 | U | 12/2017 |
| DE | 2110015 | A1 | 9/1972 |
| DE | 4406018 | C1 | 4/1995 |
| DE | 10336637 | B3 | 4/2005 |
| DE | 10345417 | A1 | 5/2005 |
| DE | 102005047771 | A1 | 4/2007 |
| DE | 102008044127 | A1 | 6/2009 |
| DE | 102013205928 | A1 | 10/2014 |
| EP | 26110022 | A2 | 7/2013 |
| GB | 1401208 | A | 7/1975 |
| JP | 2005287240 | A | 10/2005 |
| KR | 101830159 | B1 | 2/2018 |
| WO | WO2012059258 | A1 | 1/1997 |
| WO | WO2006095887 | A1 | 9/2006 |
| WO | WO2012047118 | A1 | 4/2012 |
| WO | WO2013178436 | A2 | 12/2013 |
| WO | WO2014090050 | A1 | 6/2014 |
| WO | WO2014104824 | A1 | 7/2014 |
| WO | WO2015171486 | A1 | 11/2015 |
| WO | WO2015179318 | A1 | 11/2015 |
| WO | WO2017012765 | A1 | 1/2017 |

(56) References Cited

FOREIGN PATENT DOCUMENTS

| | | | |
|---|---|---|---|
| WO | WO2017051522 | A1 | 3/2017 |
| WO | WO2017102515 | A1 | 6/2017 |
| WO | WO2017171037 | A1 | 10/2017 |
| WO | WO2017177740 | A1 | 10/2017 |
| WO | WO2021041829 | A1 | 3/2021 |

OTHER PUBLICATIONS

Ingersoll Rand, "285B Series Air Impact Wrench—Exploded View", Edition 7, Jan. 2014, 2 pages.
Ingersoll Rand, "1" D-Handle Impact Wrench 2850MAX & 2850MAX-6, Informational Brochure, 2018, 2 pages.
Ingersoll Rand, "Air Impact Wrench 2850MAX and 2850MAX-6 Product Information", Edition 3, Feb. 2018, 32 pages.
Ingersoll Rand, "Air Impact Wrench Series 285B and 295A Product Information", Edition 5, Jan. 2014, 36 pages.
International Search Report and Written Opinion for Application No. PCT/US2020/018666 dated Jul. 3, 2020 (14 pages).
Extended European Search Report for Application No. 20759157.9 date Oct. 31, 2022 (10 pages).
European Patent Office Action for Application No. 20759157.9 dated Apr. 1, 2025 (6 pages).

* cited by examiner

IMPACT TOOL

CROSS-REFERENCE TO RELATED APPLICATIONS

This application is a continuation of U.S. patent application Ser. No. 16/793,901, filed Feb. 18, 2020, issued as U.S. Pat. No. 11,780,061, which claims priority to U.S. Provisional Patent Application No. 62/807,125, filed Feb. 18, 2019, the entire contents of each of which is incorporated herein by reference.

FIELD OF THE INVENTION

The present invention relates to power tools, and more specifically to impact tools.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools.

SUMMARY OF THE INVENTION

The present invention provides, in one aspect, an impact tool including a housing, an electric motor supported within the housing and having a motor shaft, and a drive assembly configured to convert a continuous rotational input from the motor shaft to consecutive rotational impacts upon a workpiece. The drive assembly includes a camshaft having a front portion and a rear portion. The rear portion is closer to the electric motor than the front portion. The impact tool also includes a gear assembly coupled between the motor shaft and the drive assembly, the gear assembly including a ring gear that is rotationally and radially fixed relative to the housing and a plurality of planet gears meshed with the ring gear. Each of the plurality of planet gears is coupled to the rear portion of the camshaft, and a line of action of a radial load exerted by the rear portion of the camshaft on the housing passes through one of the plurality of planet gears and the ring gear.

The present invention provides, in another aspect, an impact tool including a housing with a front housing, a motor housing portion, and a support coupled between the front housing and the motor housing portion. The support includes an annular wall defining a recess. The impact tool also includes an electric motor positioned at least partially within the motor housing portion and having a motor shaft extending through the support, and a drive assembly configured to convert a continuous rotational input from the motor shaft to consecutive rotational impacts upon a workpiece. The drive assembly includes a camshaft having a front portion and a rear portion, the rear portion being closer to the electric motor than the front portion. The impact tool also includes a gear assembly coupled between the motor shaft and the drive assembly, the gear assembly including a ring gear press-fit within the recess such that the ring gear is rotationally and radially fixed to the housing, and a plurality of planet gears meshed with the ring gear. Each of the plurality of planet gears is coupled to the rear portion of the camshaft.

The present invention provides, in another aspect, an impact tool including a housing, an electric motor supported within the housing and having a motor shaft, and a drive assembly configured to convert a continuous rotational input from the motor shaft to consecutive rotational impacts upon a workpiece. The drive assembly includes a camshaft having a front portion and a rear portion, the rear portion being closer to the electric motor than the front portion, and the front portion including a cylindrical projection, an anvil including a pilot bore in which the cylindrical projection is received, and a hammer configured to reciprocate along the camshaft and to impart consecutive rotational impacts to the anvil. The impact tool also includes a gear assembly coupled between the motor shaft and the drive assembly, the gear assembly including a ring gear and a plurality of planet gears coupled to the rear portion of the camshaft and meshed with the ring gear. The impact tool also includes a bushing configured to rotationally support the anvil, the bushing having an axial length. Engagement between the anvil and the cylindrical projection defines a rearmost supported point of the anvil, and engagement between the bushing and the anvil defines a forwardmost supported point of the anvil. An axial distance from the rearmost supported point to the forwardmost supported point defines a total supported length of less than 4.25 inches. A ratio of the axial length of the bushing to the total supported length is between 0.5 and 0.9.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
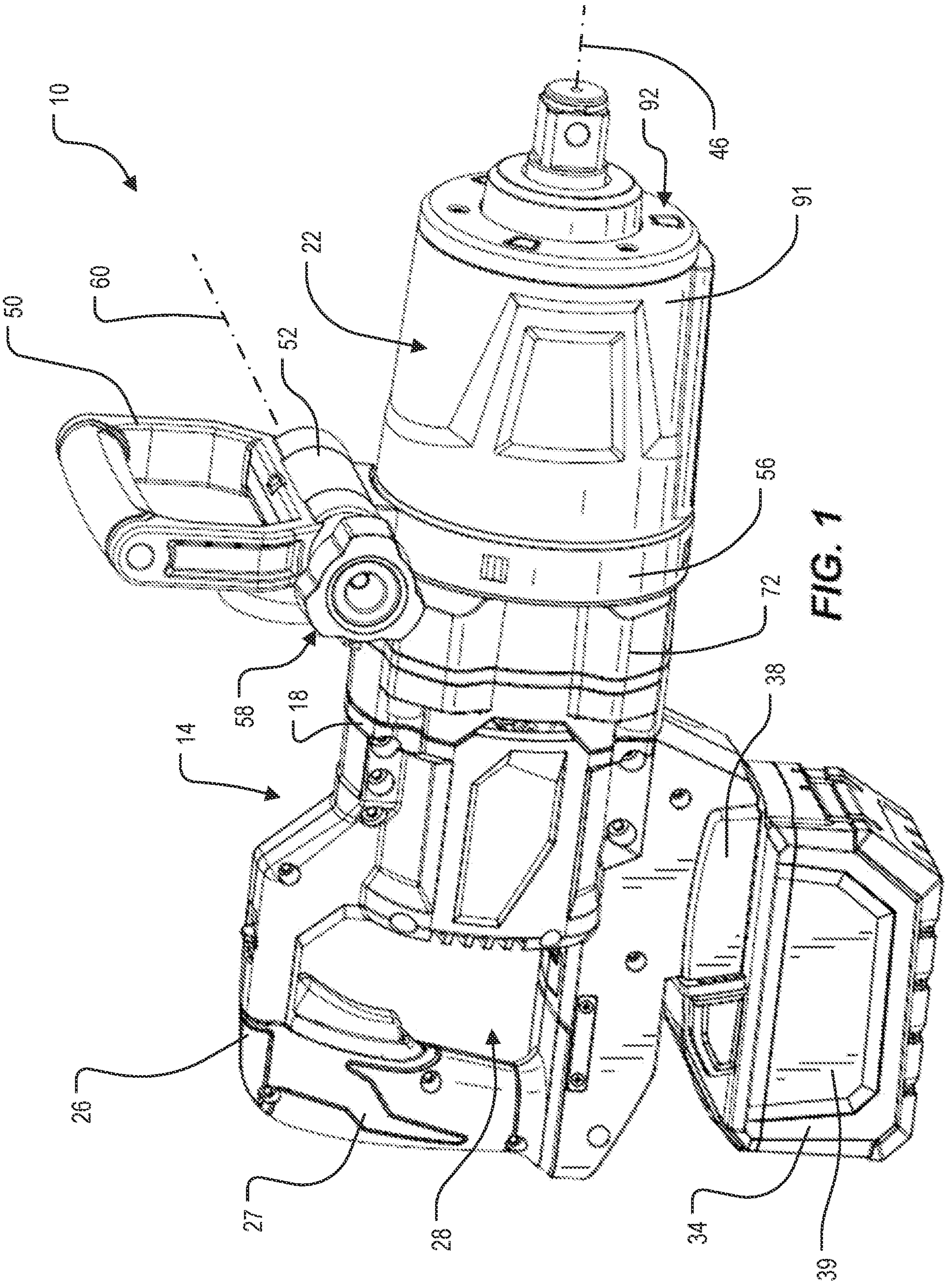
FIG. 1 is a perspective view of an impact wrench according to one embodiment.

FIG. 1 illustrates a power tool in the form of an impact tool or impact wrench 10. The impact wrench 10 includes a housing 14 with a motor housing 18, a front housing 22 coupled to the motor housing 18 (e.g., by a plurality of fasteners), and a generally D-shaped handle portion 26 disposed rearward of the motor housing 18. The handle portion 26 includes a grip 27 that can be grasped by a user operating the impact wrench 10. The grip 27 is spaced from the motor housing 18 such that an aperture 28 is defined between the grip 27 and the motor housing 18. In the illustrated embodiment, the handle portion 26 is defined by cooperating clamshell halves, and the motor housing 18 is a unitary body.

With continued reference to FIG. 1, the impact wrench 10 has a battery pack 34 removably coupled to a battery receptacle 38 located at a bottom end of the handle portion 26. The battery pack 34 includes a housing 39 enclosing a plurality of battery cells (not shown), which are electrically connected to provide the desired output (e.g., nominal voltage, current capacity, etc.) of the battery pack 34. In some embodiments, each battery cell has a nominal voltage between about 3 Volts (V) and about 5 V. The battery pack 34 preferably has a nominal capacity of at least 5 Amp-hours (Ah) (e.g., with two strings of five series-connected battery cells (a "5S2P" pack)). In some embodiments, the battery pack 34 has a nominal capacity of at least 9 Ah (e.g., with three strings of five series-connected battery cells (a "5S3P pack"). The illustrated battery pack 34 has a nominal output voltage of at least 18 V. The battery pack 34 is rechargeable, and the cells may have a Lithium-based chemistry (e.g., Lithium, Lithium-ion, etc.) or any other suitable chemistry.

Figure 2:
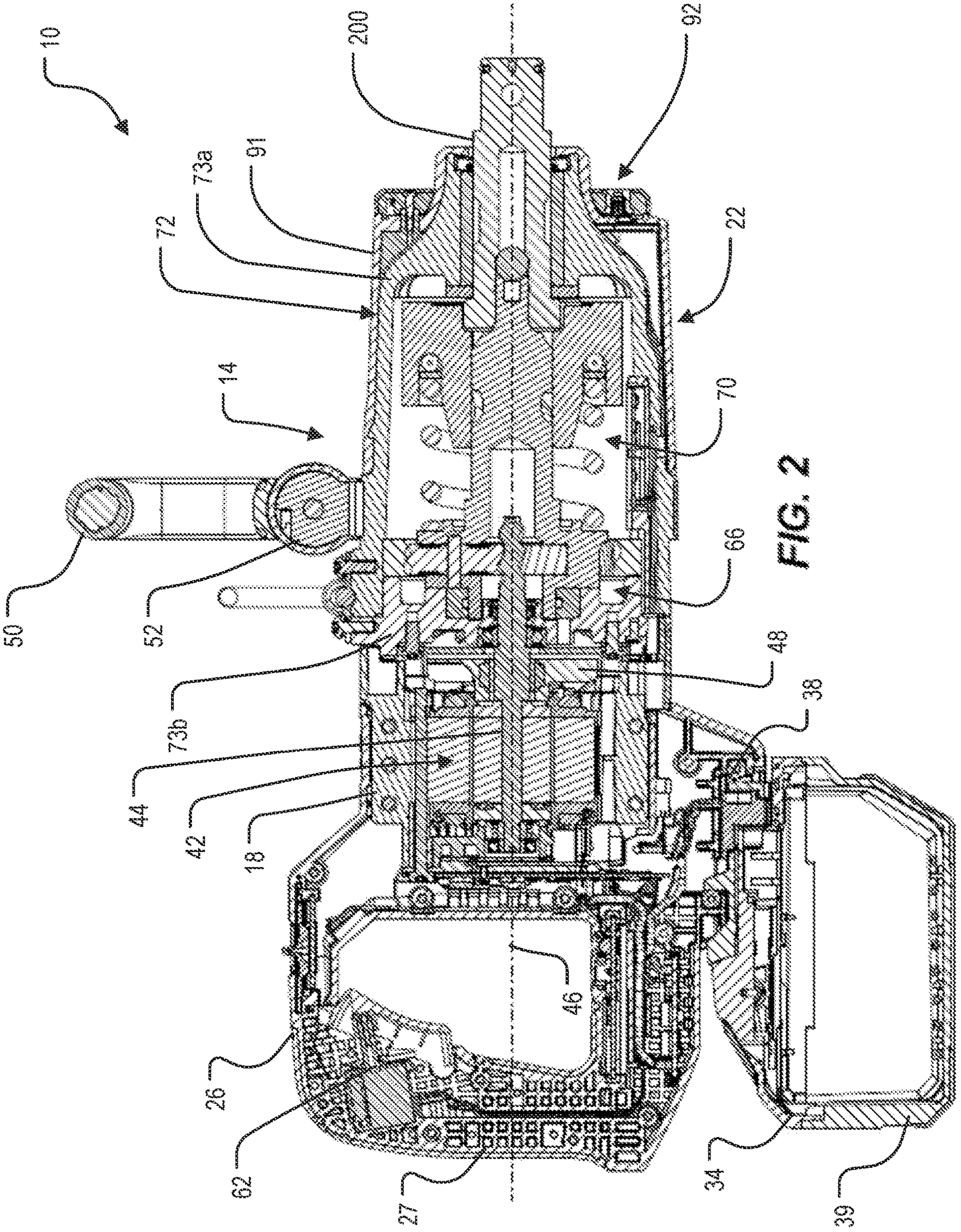
FIG. 2 is a cross-sectional view of the impact wrench of FIG. 1.
Figure 2A:
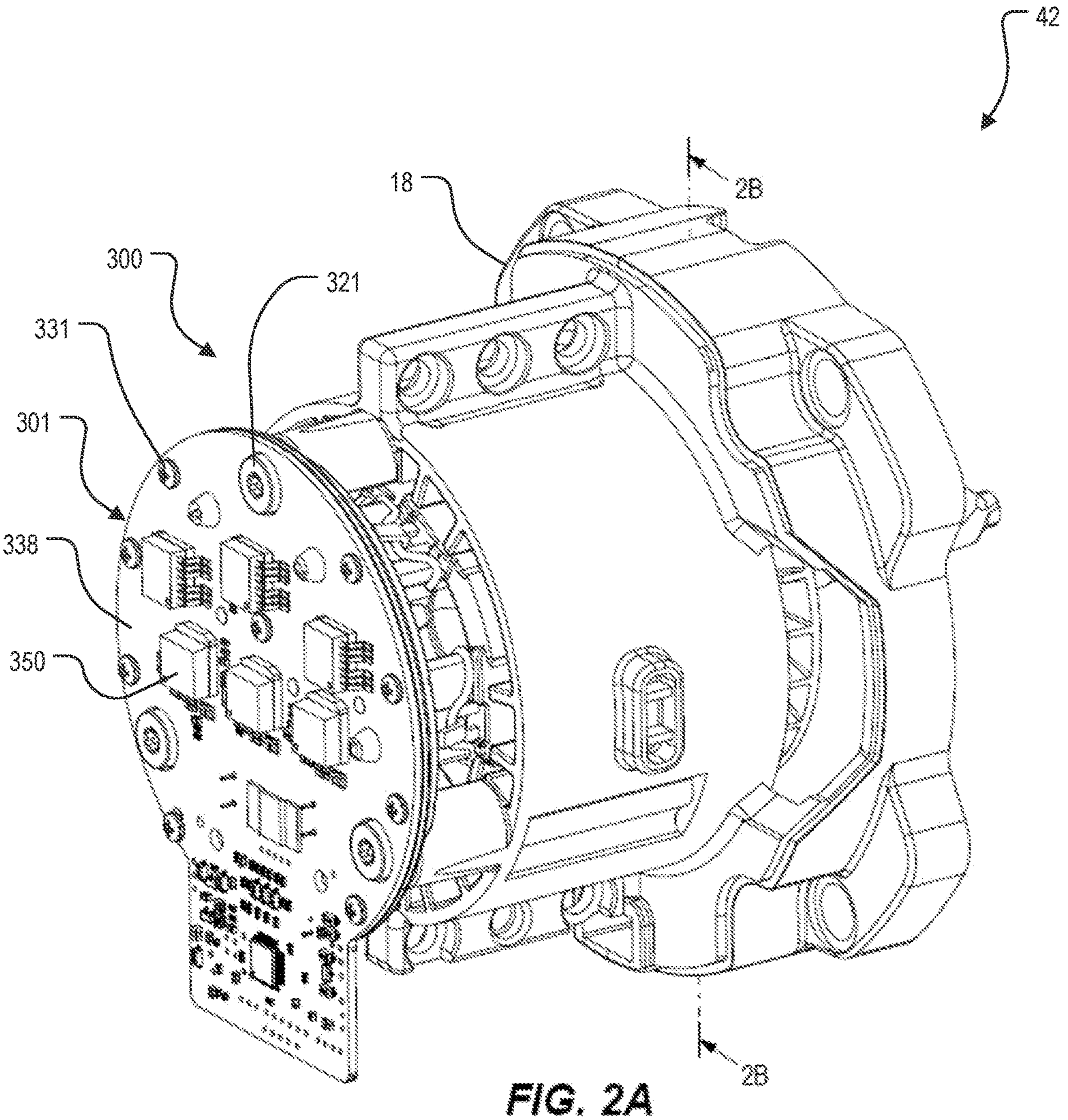
FIG. 2A is a rear perspective view illustrating a motor assembly of the impact wrench of FIG. 1.

Referring to FIG. 2, a motor assembly 42 is supported by the motor housing 18 and receives power from the battery pack 34 (FIG. 1) when the battery pack 34 is coupled to the battery receptacle 38. The illustrated motor assembly 42 includes an output shaft 44 that is rotatable about an axis 46. A fan 48 is coupled to the output shaft 44 (e.g., via a splined connection) adjacent a front end of the motor assembly 42.

Referring to FIG. 1, the illustrated impact wrench 10 further includes a second handle 50 coupled to a second handle mount 52. The second handle 50 is a generally U-shaped handle with a central grip portion 54, which may be covered by an elastomeric overmold. The second handle mount 52 includes a band clamp 56 that surrounds the front housing 22. The second handle mount 52 also includes an adjustment mechanism 58. The adjustment mechanism 58 can be loosened to permit adjustment of the second handle 50. In particular, the second handle 50 is rotatable about an axis 60 transverse to the axis 46 when the adjustment mechanism 58 is loosened. In some embodiments, loosening the adjustment mechanism 58 may also loosen the band clamp 56 to permit rotation of the second handle 50 and the second handle mount 52 about the axis 46.

The impact wrench 10 includes a trigger switch 62 provided on the first handle 26 to selectively electrically connect the motor assembly 42 and the battery pack 34 and thereby provide DC power to the motor assembly 42 (FIG. 2). In other embodiments, the impact wrench 10 may include a power cord for electrically connecting the switch 62 and the motor assembly 42 to a source of AC power. As a further alternative, the impact wrench 10 may be configured to operate using a different power source (e.g., a pneumatic power source, etc.). The battery pack 34 is the preferred means for powering the impact wrench 10, however, because a cordless impact wrench advantageously requires less maintenance (e.g., no oiling of air lines or compressor motor) and can be used in locations where compressed air or other power sources are unavailable.

Figure 2B:
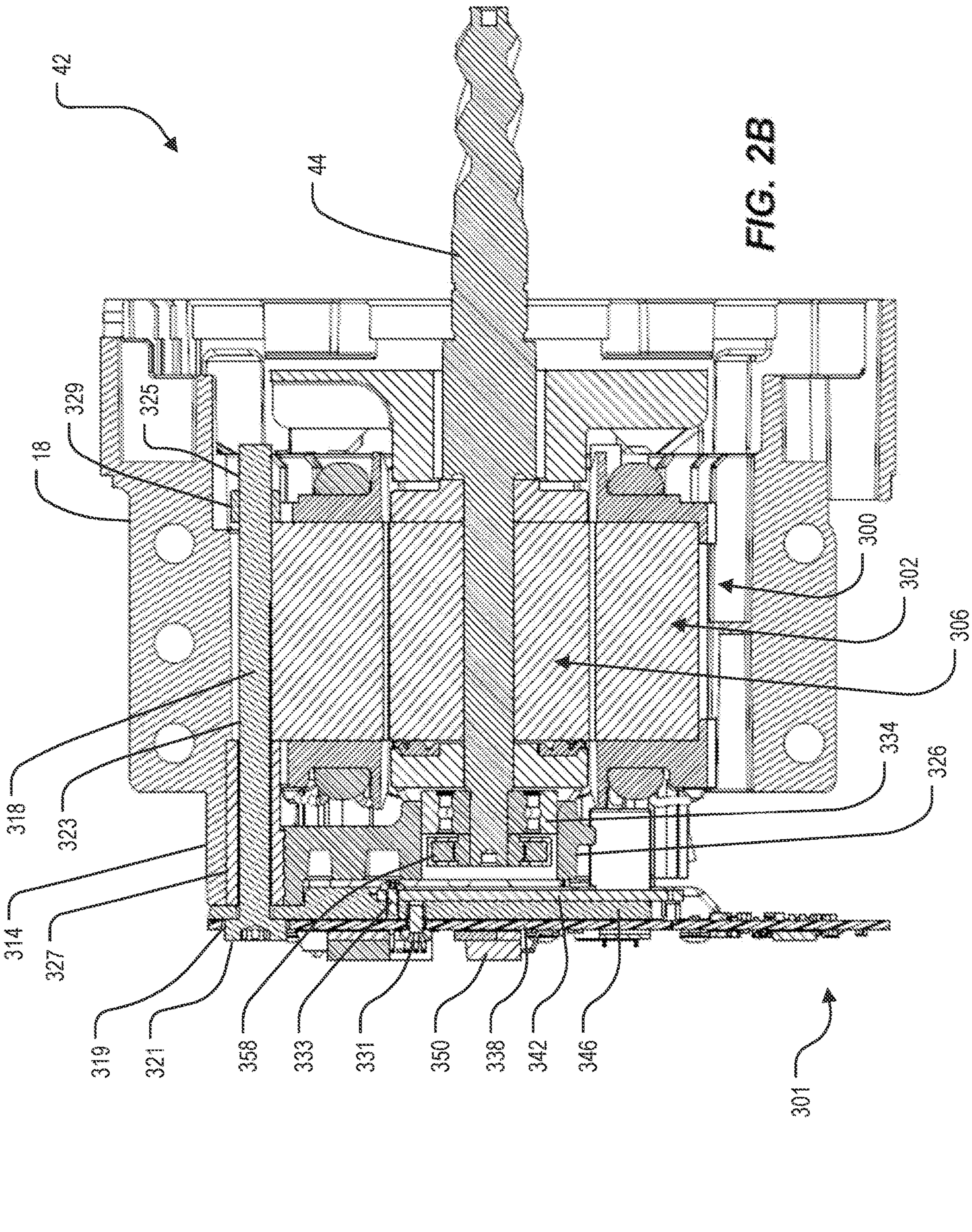
FIG. 2B is a cross-sectional view of the motor assembly of FIG. 2A.

With reference to FIGS. 2A-2D, the motor assembly 42 includes a brushless electric DC ("BLDC") motor 300 positioned within the motor housing 18 and a printed circuit board ("PCB") assembly 301 coupled to the motor housing 18 for controlling operation of the motor 300. The motor 300 includes a stator 302 with a plurality of conductive windings and a rotor core 306 extending centrally through the stator 302 (FIG. 2B). In some embodiments, the stator 302 may define an outer diameter of at least about 60 mm. In some embodiments, the outer diameter of the stator 302 may be between approximately 70 mm and approximately 100 mm. In some embodiments, the outer diameter of the stator 302 is approximately 70 mm. The rotor core 306 is formed from a plurality of stacked laminations, which may have a non-circular cross-section in some embodiments, and supports a plurality of permanent magnets (not shown). The rotor core 306 is fixed to the output shaft 44, such that the rotor core 306 and the output shaft 44 are configured to rotate together relative to the stator 302. In some embodiments, the motor 300 may be the same or similar to that described in U.S. patent application Ser. No. 16/045,513, filed Jul. 25, 2018, the entire content of which is incorporated herein by reference.

Figure 2C:
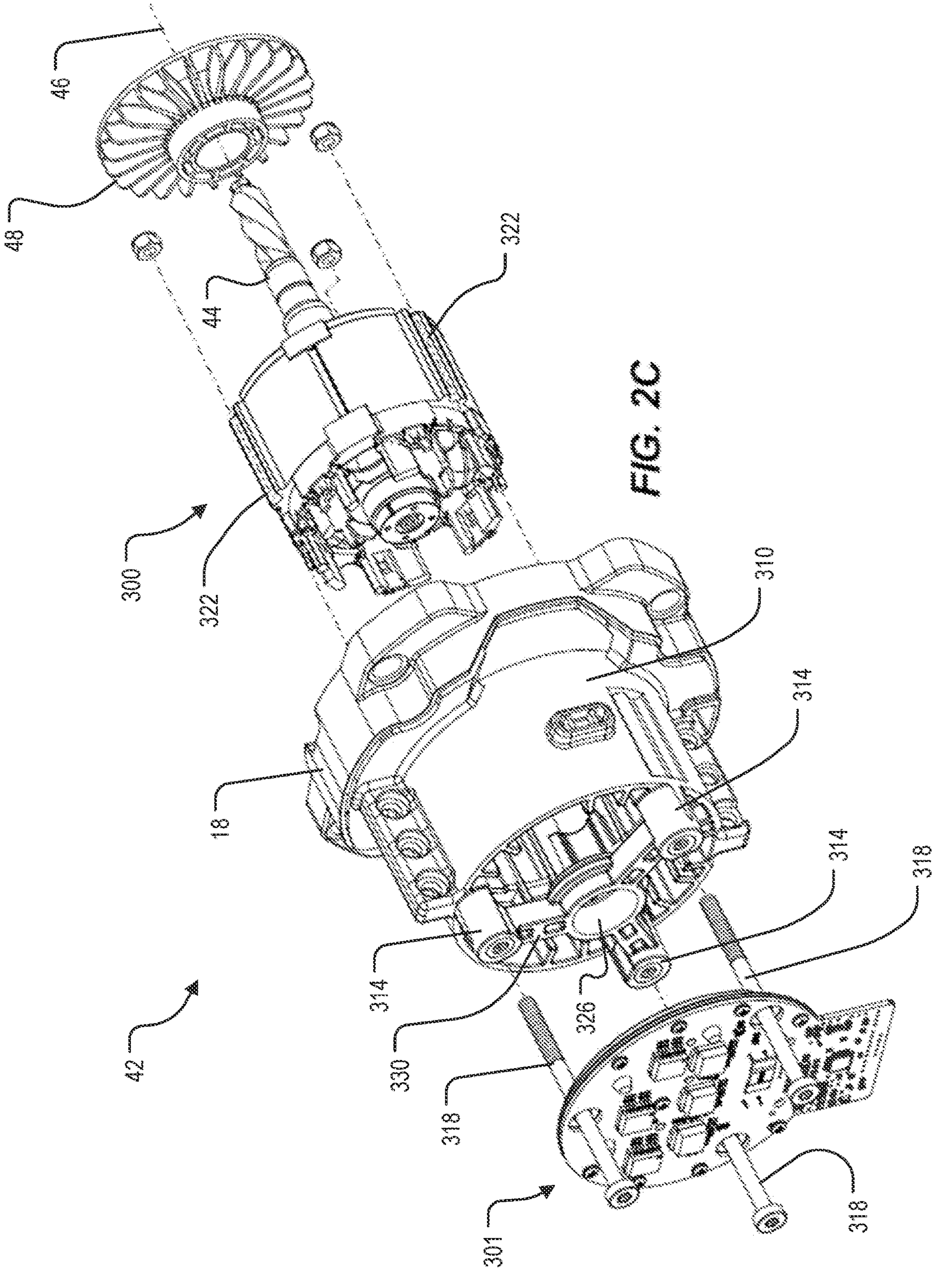
FIG. 2C is an exploded view of the motor assembly of FIG. 2A.

Referring to FIG. 2C, the illustrated motor housing 18 has a cylindrical portion 310 at least partially housing the motor 300. Mounting bosses 314 are provided along the cylindrical portion 310 through which fasteners 318 extend to couple the PCB assembly 301 to the motor housing 18. In the illustrated embodiment, the stator 302 includes external grooves 322 configured to receive the fasteners 318 such that the fasteners 318 may interconnect the PCB assembly 301, the motor housing 18, and the stator 302.

With continued reference to FIG. 2C, the motor housing 18 also includes a hub portion 326 coaxial with the cylindrical portion 310 and axially spaced from the cylindrical portion 310 and radially extending spokes 330 extending between the hub portion 326 and the mounting bosses 314. Referring to FIG. 2B, a bearing 334 for supporting the output shaft 44 is positioned within the hub portion 326. In some embodiments, the motor housing 18—including the hub portion 326, the cylindrical portion 310, and the spokes 330—may be integrally formed via a molding process. For example, in some embodiments, the motor housing 18 may be injection-molded from a polymer material.

Figure 2D:
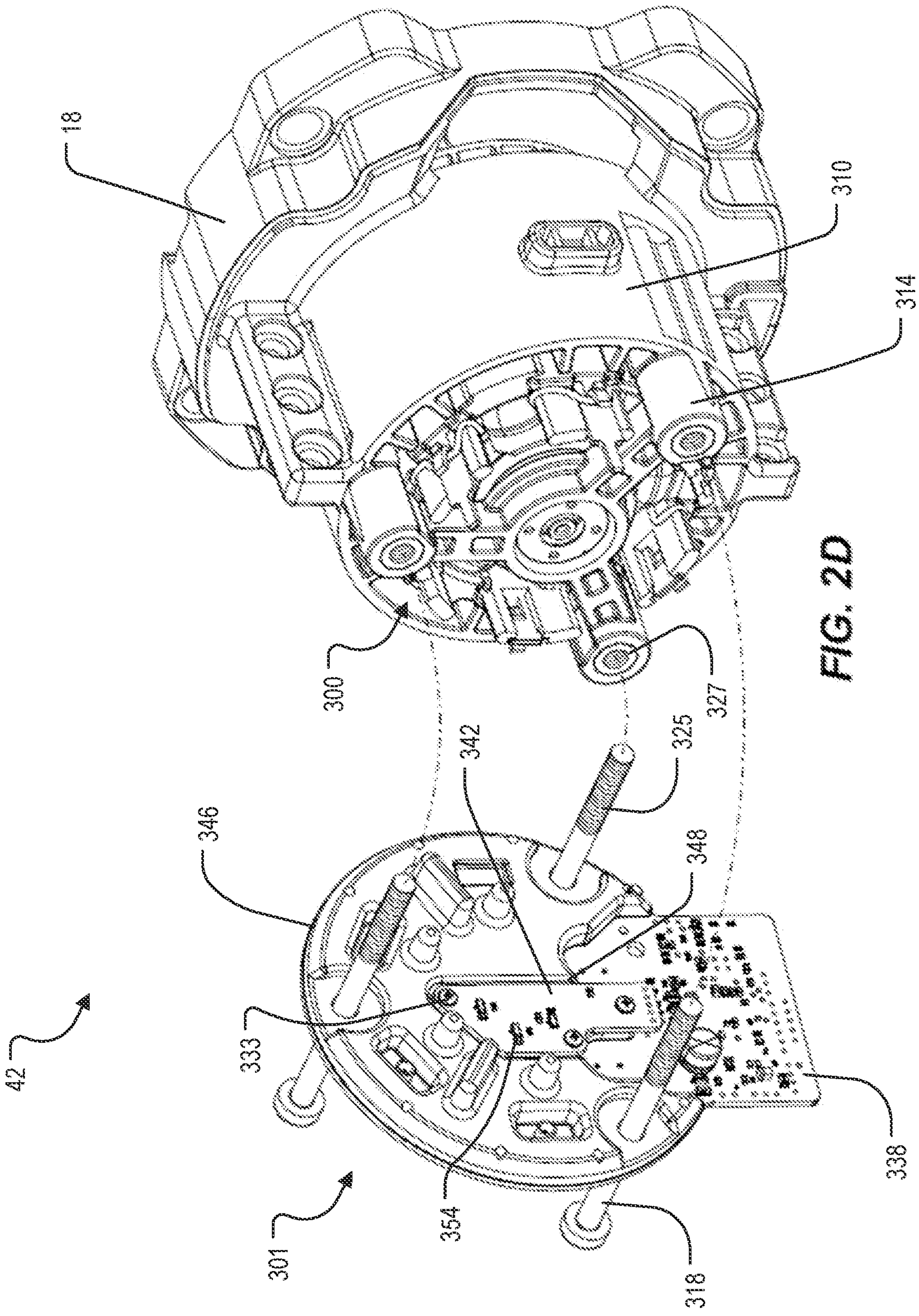
FIG. 2D is a partially exploded view of the motor assembly of FIG. 2A, illustrating a PCB assembly exploded from the remainder of the motor assembly.

With reference to FIGS. 2B and 2D, the PCB assembly 301 includes a first PCB 338 (i.e., a power circuit board), a second PCB 342 (i.e., a rotor position sensor board), and a heat sink 346. The first and second PCBs 338, 342 are coupled to opposite sides of the heat sink 346, such that the heat sink 346 is positioned between the first and second PCBs 338, 342. As such, the heat sink 346 is configured to remove heat from both the first PCB 338 and the second PCB 342. In the illustrated embodiment, the second PCB 342 is positioned within a recess 348 formed in the heat sink 346.

In the illustrated embodiment, the first PCB 338 includes through-holes 319 at locations corresponding with the locations of the fasteners 318 (FIG. 2B). In particular, each of the through-holes 319 is sized to receive a head 321 of one of the fasteners 318, such that the heads 321 of the fasteners 318 do not engage or bear against the first PCB 338 in an axial direction. Instead, the heads 321 of the fasteners 318 engage and bear against the heat sink 346 to secure the PCB assembly 301 to the motor housing 18. Accordingly, the fasteners 318 can be tensioned to a higher holding force without risk of stressing or cracking the first PCB 338.

Each of the fasteners 318 includes an unthreaded shank 323 extending from the head 321 and a threaded end portion 325 extending from the shank 323 opposite the head 321. The unthreaded shank 323 of each fastener 318 extends through a metal (e.g., steel) sleeve 327 that is fixed within the corresponding boss 314. In the illustrated embodiment, the metal sleeves 327 are insert-molded within the bosses 314 during molding of the motor housing 18. The threaded end portion 325 of each fastener 318 receives a nut 329. The nuts 329 in the illustrated embodiment are nylon lock nuts, which advantageously provide high torque capacity (to securely fasten the PCB assembly 301 to the motor housing 318) and also resist loosening.

Because the fasteners 318 directly engage the heat sink 346 (rather than the first and second PCBs 338, 342), the PCBs 338, 342 are separately coupled to the heat sink 346 by respective first and second pluralities of fasteners 331, 333. The fasteners 331, 333 are smaller than the fasteners 318 and do not penetrate entirely through the heat sink 346, Referring to FIGS. 2A-B, The power circuit board 338 includes a plurality of switches 350 (e.g., FETs, IGBTs, MOSFETs, etc.). The power source (the battery pack 34) provides operating power to the motor 300 through the switches 350 (e.g., an inverter bridge). By selectively activating the switches 350, power from the battery pack 34 is selectively applied to coils of the stator 302 to cause rotation of the rotor core 306 and output shaft 44 (FIG. 2B).

The rotor position sensor board 342 includes a plurality of Hall-effect sensors 354 (FIG. 2D). A ring shaped magnet 358 is affixed to the output shaft 44 and co-rotates with the output shaft 44, emanating a rotating a magnetic field that is detectable by the Hall-effect sensors 354. The Hall-effect sensors 354 may thus output motor feedback information, such as an indication (e.g., a pulse) when the Hall-effect sensors 354 detect a pole of the magnet 358. Based on the motor feedback information from the Hall-effect sensors 354, a motor controller (e.g., a microprocessor, which may be incorporated on to the first PCB 338, the second PCB 342, or elsewhere) may determine the rotational position, velocity, and/or acceleration of the output shaft 44.

The motor controller may also receive control signals from the user input. The user input may include, for example, the trigger switch 62, a forward/reverse selector switch, a mode selector switch, etc. In response to the motor feedback information and the user control signals, the motor controller may transmit control signals to the switches 350 to drive the motor 300. By selectively activating the switches 350, power from the battery pack 34 is selectively applied to the coils of the stator 302 to cause rotation of the output shaft 44. In some embodiments, the motor controller may also receive control signals from an external device such as, for example, a smartphone wirelessly through a transceiver (not shown).

With reference to FIG. 2, the impact wrench 10 further includes a gear assembly 66 coupled to the motor output shaft 44 and an impact mechanism or drive assembly 70 coupled to an output of the gear assembly 66. The gear assembly 66 and the drive assembly 70 are at least partially disposed within a gear case 72 of the front housing 22. In the illustrated embodiment, the gear case 72 includes a main body portion 73*a* and a rear end cap or support 73*b* fixed to the main body portion 73*a* (e.g., by a plurality of fasteners, a press-fit, a threaded connection, or in any other suitable manner). The front housing 22 includes a cover 91 coupled to and surrounding the main body portion 73*a* of the gear case 72. In the illustrated embodiment, the cover 91 supports a lighting source 92 (e.g., including three LEDs evenly spaced about the axis 45) for illuminating a workpiece during operation of the impact wrench 10. In some embodiments, the cover 91 may be at least partially made of an elastomeric material to provide protection for the gear case 72. The cover 91 may be permanently affixed to the gear case 72 or may be removable and replaceable.

Figure 2E:
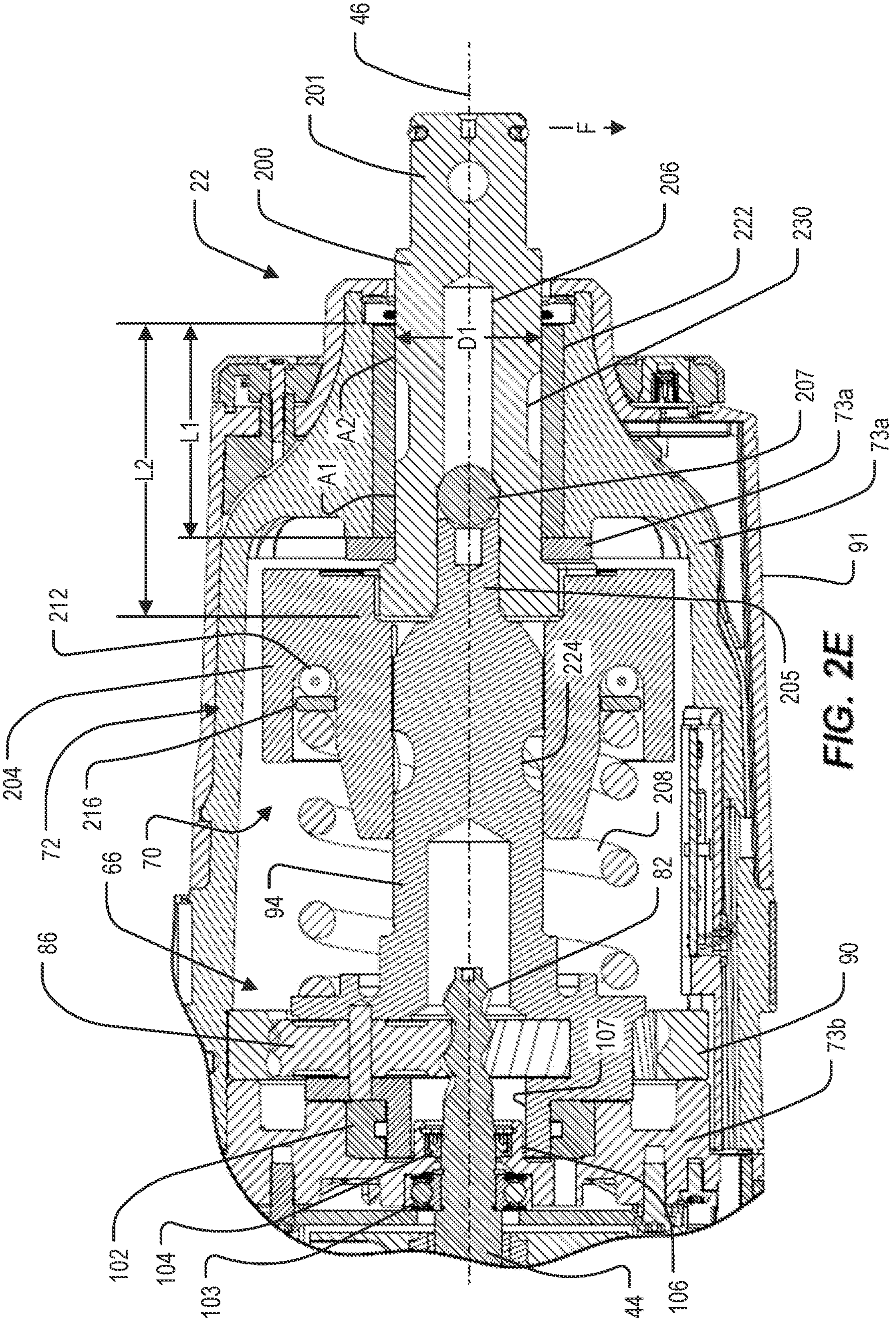
FIG. 2E is an enlarged cross-sectional view illustrating a front portion of the impact wrench of FIG. 1.

The gear assembly 66 may be configured in any of a number of different ways to provide a speed reduction between the output shaft 44 and an input of the drive assembly 70. Referring to FIG. 2E, the illustrated gear assembly 66 includes a helical pinion 82 formed on the motor output shaft 44, a plurality of helical planet gears 86, and a helical ring gear 90. The output shaft 44 extends through the rear end cap 73*b* such that the pinion 82 is received between and meshed with the planet gears 86. The helical ring gear 90 surrounds and is meshed with the planet gears 86 and is rotationally fixed within the gear case 72 (e.g., via projections on an exterior of the ring gear 90 cooperating with corresponding grooves formed inside the gear case 72). The planet gears 86 are mounted on a camshaft 94 of the drive assembly 70 such that the camshaft 94 acts as a planet carrier for the planet gears 86.

Accordingly, rotation of the output shaft 44 rotates the planet gears 86, which then advance along the inner circumference of the ring gear 90 and thereby rotate the camshaft 94. In the illustrated embodiment, the gear assembly 66 provides a gear ratio from the output shaft 44 to the camshaft 94 between 10:1 and 14:1; however, the gear assembly 66 may be configured to provide other gear ratios.

With continued reference to FIG. 2E, the camshaft 94 is rotationally supported at its rear end (i.e. the end closest to the motor assembly 42) by a radial bearing 102. The bearing 102, in turn, is supported by the rear end cap 73*b* of the gear case 72. In some embodiments, the bearing 102 may be pressed into the rear end cap 73*b*. The bearing 102 may be a roller bearing in some embodiments. In the illustrated embodiment, the bearing 102 is a bushing, which may advantageously be less costly and/or more durable than a roller bearing.

In the illustrated embodiment, the output shaft 44 is rotationally supported by a radial bearing 103. The radial bearing 103 may be a roller bearing (e.g., a ball bearing), a bushing, or any other suitable bearing to radially support the output shaft 44. A shaft seal 104 surrounds the output shaft 44 in front of the radial bearing 103. The shaft seal 104 provides a fluid or grease-tight seal between the motor housing 18 and the gear case 72. The radial bearing 103 and the shaft seal 104 are each supported within the rear end cap 73*b* of the gear case 72. In the illustrated embodiment, the rear end cap 73*b* includes a boss 106 in which the shaft seal 104 is supported. The boss 106 extends into a bore 107 in the rear end of the camshaft 94. In some embodiments, the exterior surface of the boss 106 may be engageable with the interior surface of the bore 107 to further support and align the rear end of the camshaft 94. In addition, because the shaft seal 104 is supported inside the camshaft 94, the axial length of the impact wrench 10 is reduced.

With continued reference to FIG. 2E, the drive assembly 70 includes an anvil 200, extending from the front housing 22 and having a drive end 201 to which a tool element (e.g., a socket; not shown) can be coupled for performing work on a workpiece (e.g., a fastener). In the illustrated embodiment, the drive end 201 has a square cross-section (i.e. a square drive). The drive end 201 may have a nominal dimension between about ¾" and about 2" in some embodiments, or about 1" in some embodiments.

The drive assembly 70 is configured to convert the continuous rotational force or torque provided by the motor assembly 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

The camshaft 94 includes a cylindrical projection 205 adjacent the front end of the camshaft 94. The cylindrical projection 205 is smaller in diameter than the remainder of the camshaft 94 and is received within a pilot bore 206 extending through the anvil 200 along the axis 46. The engagement between the cylindrical projection 205 and the pilot bore 206 rotationally and radially supports the front end of the camshaft 94. A ball bearing 207 is seated within the pilot bore 206. The cylindrical projection abuts the ball bearing 207, which acts as a thrust bearing to resist axial loads on the camshaft 94.

Thus, in the illustrated embodiment, the camshaft 94 is rotationally and radially supported at its rear end by the bearing 102 and at its front end by the anvil 200. Because the radial position of the planet gears 86 on the camshaft 94 is fixed, the position of the camshaft 94 sets the position of the planet gears 86. In some embodiments, the ring gear 90 may be coupled to the gear case 72 such that the ring gear 90 may move radially to a limited extent or "float" relative to the gear case 72. This facilitates alignment between the planet gears 86 and the ring gear 90.

With continued reference to FIG. 2E, the drive assembly 70 further includes a spring 208 biasing the hammer 204 toward the front of the impact wrench 10 (i.e., in the right direction of FIG. 2E). In other words, the spring 208 biases the hammer 204 in an axial direction toward the anvil 200, along the axis 46. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs (not shown) on the hammer 204 engage and impact corresponding anvil lugs (not shown) to transfer kinetic energy from the hammer 204 to the anvil 200.

The camshaft 94 further includes cam grooves 224 in which corresponding cam balls (not shown) are received. The cam balls are in driving engagement with the hammer 204 and movement of the cam balls within the cam grooves 224 allows for relative axial movement of the hammer 204 along the camshaft 94 when the hammer lugs and the anvil lugs are engaged and the camshaft 94 continues to rotate. A bushing 222 is disposed at a front end of the main body 73*a* of the gear case 72 to rotationally support the anvil 200. A washer 226, which in some embodiments may be an integral flange portion of bushing 222, is located between the anvil 200 and a front end of the front housing 22. In some embodiments, multiple washers 226 may be provided as a washer stack.

The bushing 222 has an axial length L1 along which the anvil 200 is rotationally supported. In the illustrated embodiment, the anvil 200 includes an annular groove 230 or necked portion that is positioned between the axial ends of the bushing 222. The annular groove 230 separates two annular contact areas A1, A2 where the anvil 200 contacts the interior of the bushing 222. The annular groove 230, as well as the bore 206, advantageously reduce the weight of the anvil 200. In addition, the spaced contact areas A1, A2 are better able to support the anvil 200 against radial forces applied to the anvil 200. For example, a downward radial force F, illustrated in FIG. 2E, produces a moment that will tend to pivot the drive end 201 of the anvil 200 downward. The distance between the contact areas A1, A2 provides greater leverage to resist this moment.

The anvil 200 is at least partially supported by the cylindrical projection 205 of the camshaft 94 and the bushing 222. The anvil 200 has a total supported length L2 defined as an axial distance from the rearmost supported point of the anvil 200 to the forwardmost supported point of the anvil 200. In the illustrated embodiment, the total supported length L2 is 3.2 inches. In other embodiments, the total supported length L2 may be between 3.0 inches and 3.5 inches. In other embodiments, the total supported length L2 may be between 2.5 inches and 4.0 inches. In other embodiments, the total supported length L2 is less than 4.25 inches.

In the illustrated embodiment, the length L1 of the bushing 222 is 2.6 inches. In other embodiments, the length L1 may be between 2 inches and 3 inches. In other embodiments, the length L1 may be between 1.5 inches and 3.5 inches. A ratio of the length L1 of the bushing 222 to the total supported length L2 in the illustrated embodiment is about 0.8 in the illustrated embodiment. In other embodiments, the ratio of the length L1 of the bushing 222 to the total supported length L2 may be between 0.7 and 0.8. In other embodiments, the ratio of the length L1 of the bushing 222 to the total supported length L2 may be between 0.5 and 0.9.

In the illustrated embodiment, the anvil 200 has a diameter D1 at the contact areas A1, A2 of 1.26 inches. As such, a ratio of the length L1 of the bushing 222 to the diameter D1 of the anvil 200 is about 2.1. In other embodiments, the ratio of the length L1 of the bushing 222 to the diameter D1 of the anvil 200 is between about 1.8 and about 2.3. In other embodiments, the ratio of the length L1 of the bushing 222 to the diameter D1 of the anvil 200 is between about 1.6 and about 2.5.

The long length L1 of the bushing 222 and the separated contact areas A1, A2 provide the anvil 200 with improved support and greater resistance to radial forces that may be encountered during operation of the impact wrench 10. The improved support may be particularly advantageous when the anvil 200 is coupled to a long socket, or when an extended anvil is used. In such embodiments, the additional weight and length may increase the moment on the anvil 200.

In operation of the impact wrench 10, an operator activates the motor assembly 42 (e.g., by depressing a trigger), which continuously drives the gear assembly 66 and the camshaft 94 via the output shaft 44. As the camshaft 94 rotates, the cam balls drive the hammer 204 to co-rotate with the camshaft 94, and the hammer lugs engage, respectively, driven surfaces of the anvil lugs to provide an impact and to rotatably drive the anvil 200 and the tool element. After each impact, the hammer 204 moves or slides rearward along the camshaft 94, away from the anvil 200, so that the hammer lugs disengage the anvil lugs 220.

As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs disengage the respective anvil lugs, the hammer 204 continues to rotate and moves or slides forwardly, toward the anvil 200, as the spring 208 releases its stored energy, until the drive surfaces of the hammer lugs re-engage the driven surfaces of the anvil lugs to cause another impact.

Figure 3:
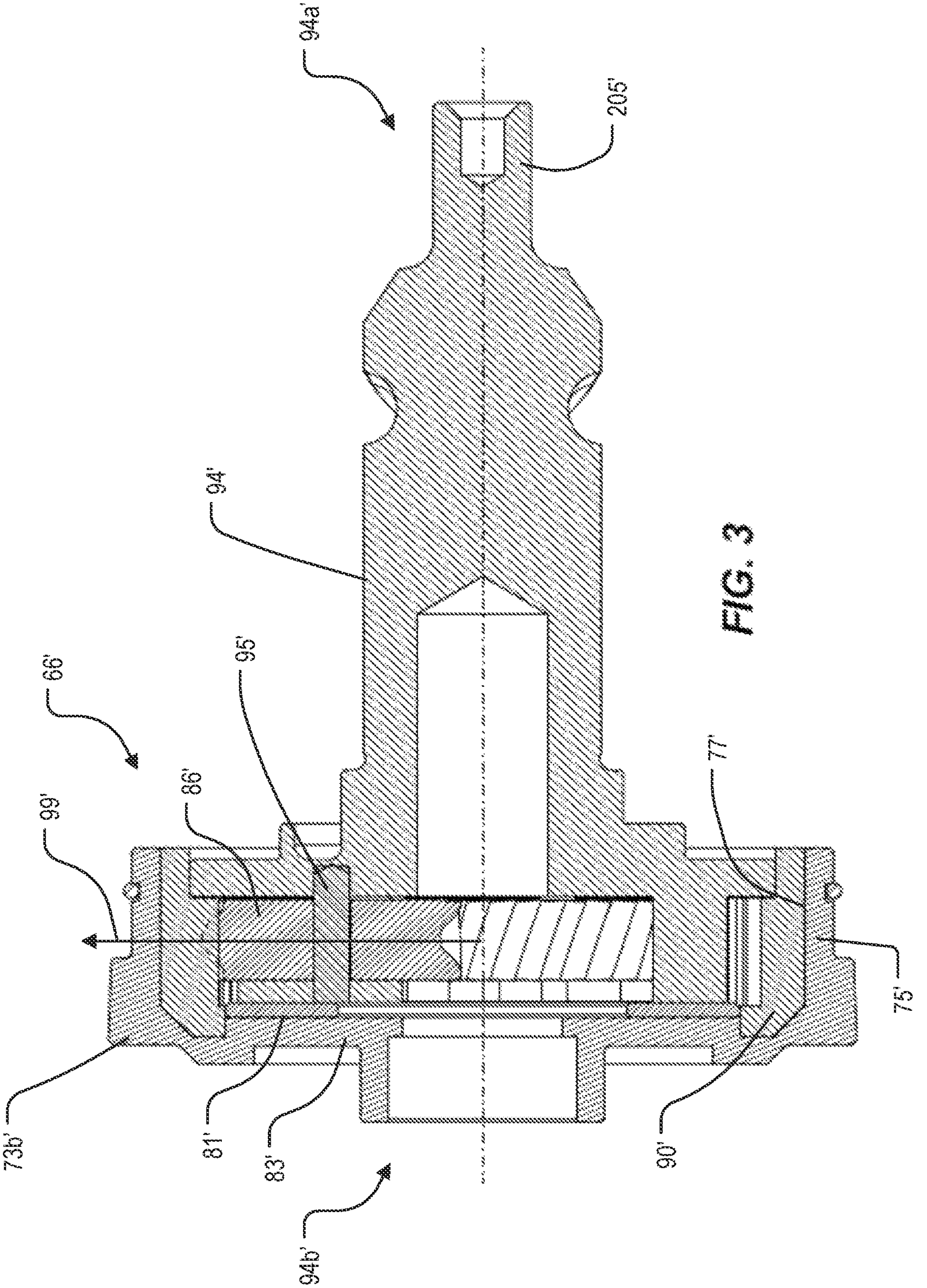
FIG. 3 is a cross-sectional view illustrating a camshaft and gear assembly usable with the impact wrench of FIG. 1.
Figure 4:
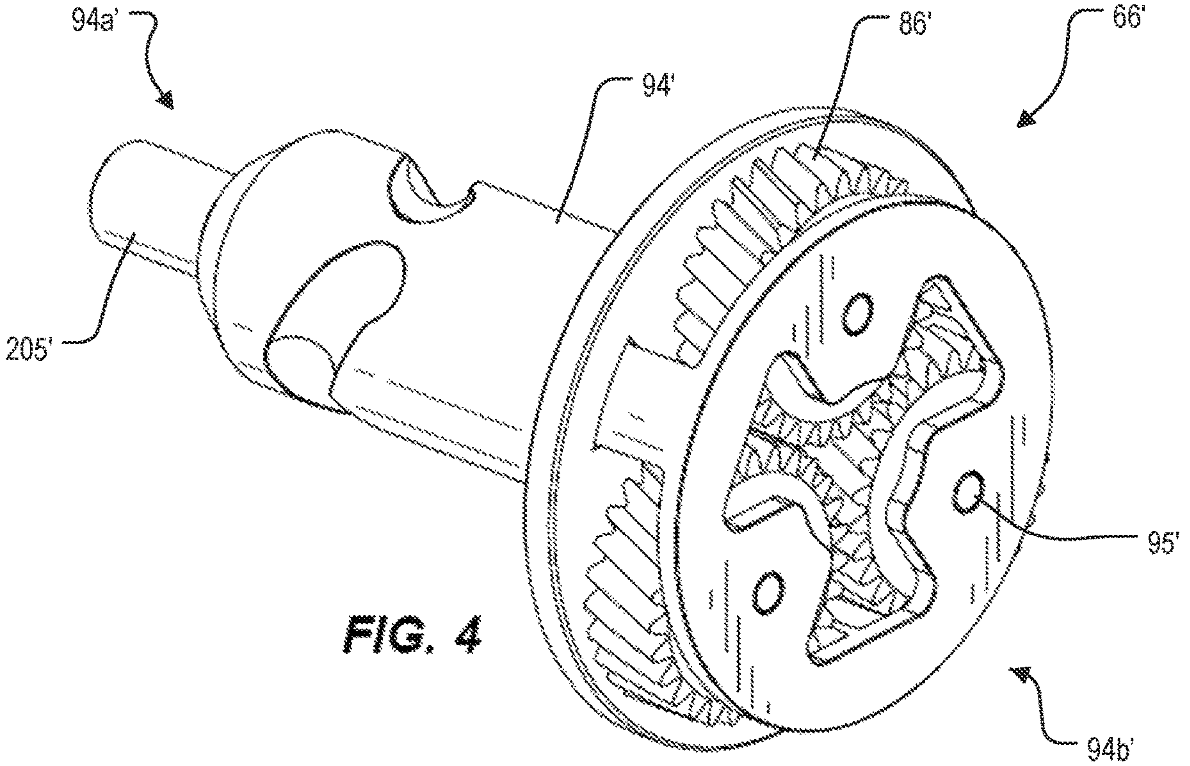
FIG. 4 is a perspective view of the camshaft of FIG. 3 supporting a plurality of planet gears of the gear assembly.
Figure 5:
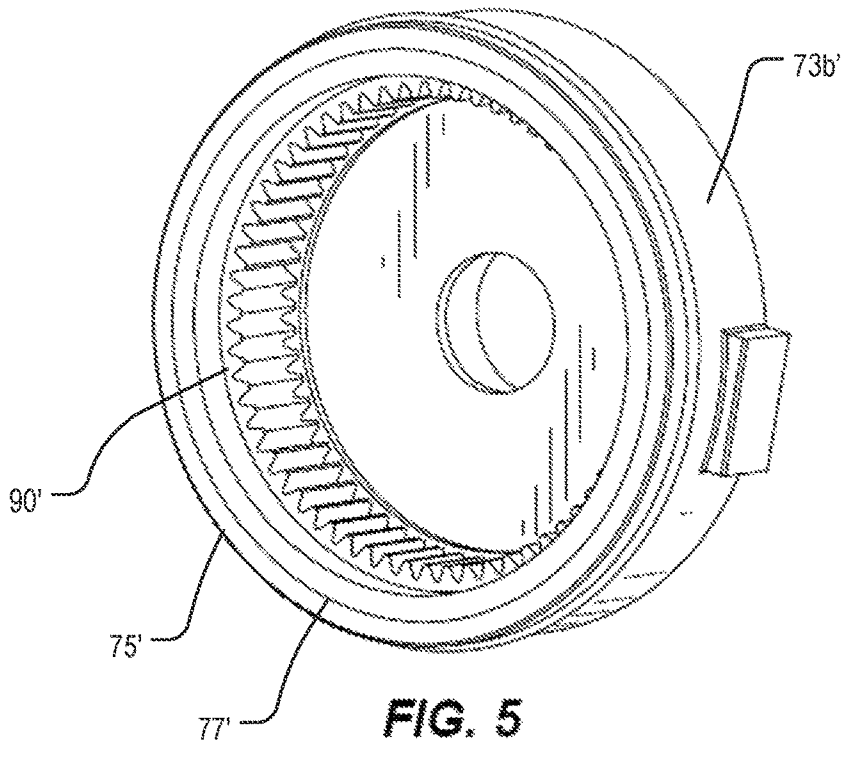
FIG. 5 is a perspective view illustrating a ring gear of the gear assembly of FIG. 3.

FIGS. 3-5 illustrates a gear assembly 66' and camshaft 94' according to another embodiment, which may be incorporated into the impact wrench 10 described above with reference to FIGS. 1 and 2. Features and elements of the gear assembly 66' and the camshaft 94' corresponding with features and elements of the gear assembly 66 and camshaft 94 described above are given identical reference numbers, appended by a prime symbol.

With reference to FIG. 3, the gear assembly 66' includes a plurality of helical planet gears 86' and a helical ring gear 90' meshed with the planet gears 86'. In other embodiments, the gears 86', 90' may be spur gears. The camshaft 94' has a front portion **94*a*' including the front end of the camshaft 94' and a rear portion 94*b*' including the rear end of the camshaft 94'. When the camshaft 94' is assembled with the impact tool 10, the rear portion 94*b*' is positioned closer to the motor assembly 42 than the front portion 94*a*'**.

Referring to FIGS. 3-4, the planet gears 86' are coupled to the rear portion **94*b*' of the camshaft 94' by pins 95', such that the camshaft 94' acts as a carrier for the planet gears 86'. Like the camshaft 94, the front portion 94*a*' of the camshaft 94' includes a cylindrical projection 205' that is received within the pilot bore 206 of the anvil 200 (FIG. 2) to rotationally and radially support the front portion 94*a*' of the camshaft 94'. The cylindrical projection 205' is also engageable with the ball bearing 207 to transfer forward axial loads on the camshaft 94' to the anvil 200**.

Unlike the ring gear 90, which is rotationally fixed relative to the gear case 72 but permitted to float radially within the gear case 72, the ring gear 90' is both rotationally and radially fixed within the gear case 72. In the illustrated embodiment, the rear end cap **73*b*' of the gear case 72 includes an axially-extending annular wall 75' that defines a recess 77' (FIG. 5). The ring gear 90' is press-fit within the recess 77'. In other embodiments, the ring gear 90' may be coupled to the rear end cap 73*b*' in any other suitable manner to both rotationally and radially fix the ring gear 90'. In other embodiments, the ring gear 90' may be integrally formed as a single piece with the rear end cap 73*b*'. In some embodiments, the ring gear 90', the rear end cap 73*b*'**, or both may be made of powdered metal.

Referring to FIG. 3, in the illustrated embodiment, a washer 81' is disposed between a radially-extending rear wall 83' of the rear end cap **73*b*' and the rear end of the camshaft 94'. The camshaft 94' engages the washer 81' to transfer rearward axial loads (i.e. rearward thrust loads) on the camshaft 94' to the rear end cap 73*b*', and the washer 81' provides for low-friction sliding contact with the camshaft 94'. In some embodiments, the washer 81'** may be replaced by a thrust bearing.

Because the ring gear 90' is radially fixed, the ring gear 90' rotationally and radially supports the rear portion **94*b*' of the camshaft 94' via the planet gears 86'. Thus, a radial load exerted by the rear portion 94*b*' of the camshaft 94' on the housing 14 has a line of action or force vector 99' that passes through at least one of the plurality of planet gears 86', the ring gear 90', and the annular wall 75' of the rear end cap 73*b*' (FIG. 3). As such, the bearing 102 described above with reference to FIG. 2 can be omitted. This shortens the overall length of the camshaft 94' compared to the camshaft 94, which advantageously allows for the impact wrench 10** to be more compact.

Various features of the invention are set forth in the following claims.

What is claimed is:

1. An impact tool comprising:

a housing;

a motor supported within the housing and having a motor shaft;

a drive assembly configured to convert a continuous rotational input from the motor shaft to consecutive rotational impacts upon a workpiece, the drive assembly including a hammer, an anvil, and a camshaft having a front portion and a rear portion defining a carrier, the rear portion being closer to the motor than the front portion;

a thrust bearing engageable with the rear portion of the camshaft; and a gear assembly coupled between the motor shaft and the drive assembly, the gear assembly including a ring gear and a plurality of planet gears meshed with the ring gear;

a gear case in which the gear assembly is at least partially received, the gear case including a rear end cap adjacent the motor, the thrust bearing disposed between the rear portion of the camshaft and the rear end cap, wherein each of the plurality of planet gears is coupled to the carrier of the camshaft, and wherein the ring gear rotationally and radially supports the rear portion of the camshaft via the plurality of planet gears, and wherein the rear portion of the camshaft engages the thrust bearing to transfer axial thrust loads to the rear end cap.

2. The impact tool of claim 1, wherein a line of action of a radial load exerted by the rear portion of the camshaft on the housing passes through at least one of the plurality of planet gears and the ring gear.

3. The impact tool of claim 1, wherein the drive assembly is at least partially received in the gear case, and the housing further including a motor housing in which the motor is at least partially received.

4. The impact tool of claim 3, wherein the rear end cap is adjacent the motor housing, and wherein the motor shaft extends through the rear end cap.

5. The impact tool of claim 4, wherein the rear end cap includes a recess, and wherein the ring gear is press-fit within the recess.

6. The impact tool of claim 4, wherein the ring gear is integrally formed with the rear end cap.

7. The impact tool of claim 6, wherein the rear end cap, including the ring gear, is made of powdered metal.

8. The impact tool of claim 4, wherein the thrust bearing is disposed between the rear portion of the camshaft and a rear wall of the rear end cap, and wherein the motor shaft extends through the rear wall of the rear end cap.

9. The impact tool of claim 1, wherein:

the hammer is configured to reciprocate along the camshaft and to impart consecutive rotational impacts to the anvil, the front portion of the camshaft includes a cylindrical projection, the anvil includes a pilot bore in which the cylindrical projection is received, and the front portion of the camshaft is radially supported by engagement between the cylindrical projection and an inner periphery of the pilot bore.

10. The impact tool of claim 9, further comprising a bushing configured to rotationally support the anvil, wherein the anvil includes an annular recess, and wherein the anvil is engageable with the bushing at a first contact area and a second contact area separated from the first contact area by the annular recess.

11. The impact tool of claim 10, wherein the bushing has an axial length between 1.5 inches and 3.5 inches.

12. The impact tool of claim 10, wherein engagement between the anvil and the cylindrical projection defines a rearmost supported point of the anvil, wherein engagement between the bushing and the anvil defines a forwardmost supported point of the anvil, wherein an axial distance from the rearmost supported point to the forwardmost supported point defines a total supported length of less than 4.25 inches, and wherein a ratio of an axial length of the bushing to the total supported length is between 0.5 and 0.9.

13. An impact tool comprising:

a housing including a motor housing and a gear case, the gear case including a rear end cap adjacent the motor housing;

a motor supported within the motor housing and having a motor shaft extending through a wall of the rear end cap;

a drive assembly configured to convert a continuous rotational input from the motor shaft to consecutive rotational impacts upon a workpiece, the drive assembly including a camshaft having a front portion and a rear portion defining a carrier, the rear portion being closer to the motor than the front portion;

a thrust bearing disposed between the rear portion of the camshaft and the wall of the rear end cap, wherein the rear portion of the camshaft engages the thrust bearing to transfer axial thrust loads to the rear end cap; and a gear assembly coupled between the motor shaft and the drive assembly, the gear assembly including a ring gear and a plurality of planet gears meshed with the ring gear, wherein each of the plurality of planet gears is coupled to the carrier of the camshaft.

14. The impact tool of claim 13, wherein the rear end cap includes a recess, and wherein the ring gear is press-fit within the recess.

15. The impact tool of claim 13, wherein the ring gear is integrally formed with the rear end cap.

16. The impact tool of claim 15, wherein the rear end cap, including the ring gear, is made of powdered metal.

17. The impact tool of claim 13, wherein:

the drive assembly includes a hammer and an anvil, the hammer is configured to reciprocate along the camshaft and to impart consecutive rotational impacts to the anvil, the front portion of the camshaft includes a cylindrical projection, the anvil includes a pilot bore in which the cylindrical projection is received, and the front portion of the camshaft is radially supported by engagement between the cylindrical projection and an inner periphery of the pilot bore.

18. An impact tool comprising:

a housing;

a motor supported within the housing and having a motor shaft;

a drive assembly configured to convert a continuous rotational input from the motor shaft to consecutive rotational impacts upon a workpiece, the drive assembly including a camshaft, an anvil, and a hammer configured to reciprocate along the camshaft and to impart consecutive rotational impacts to the anvil;

a gear assembly coupled between the motor shaft and the drive assembly, the gear assembly including a ring gear and a plurality of planet gears coupled to the camshaft and meshed with the ring gear; and a bushing configured to rotationally support the anvil, the bushing having an axial length, wherein engagement between the anvil and the camshaft defines a rearmost supported point of the anvil, wherein engagement between the bushing and the anvil defines a forwardmost supported point of the anvil, wherein an axial distance from the rearmost supported point to the forwardmost supported point defines a total supported length of less than 4.25 inches, and wherein a ratio of the axial length of the bushing to the total supported length is between 0.5 and 0.9.

19. The impact tool of claim 18, wherein the anvil includes an annular recess, and wherein the anvil is engageable with the bushing at a first contact area and a second contact area separated from the first contact area by the annular recess.

* * * * *